UNITED STATES PATENT OFFICE.

WALTER S. LANDIS, OF NIAGARA FALLS, NEW YORK, ASSIGNOR TO FRANK S. WASHBURN, OF NASHVILLE, TENNESSEE.

PROCESS OF PRODUCING NITROSE GASES.

1,242,953.  Specification of Letters Patent.  Patented Oct. 16, 1917.

No Drawing.  Application filed February 20, 1915. Serial No. 9,742.

*To all whom it may concern:*

Be it known that I, WALTER S. LANDIS, a citizen of the United States, residing at Niagara Falls, in the county of Niagara and State of New York, have invented certain new and useful Improvements in Processes of Producing Nitrose Gases; and I do hereby declare the following to be a full, clear, and exact description of the invention, such as will enable others skilled in the art to which it appertains to make and use the same.

This invention relates to a process of producing nitrose gases, and has for its object to attain this result in a manner more efficient and less costly than has heretofore been proposed.

With this and other objects in view the invention consists in the novel steps and combinations of steps constituting my process all as will be more fully hereinafter disclosed and particularly pointed out in the claims.

In my copending applications No. 9596 filed Feb. 20, 1915, entitled Process of and apparatus for oxidizing ammonia, and No. 9595 filed Feb. 20, 1915, entitled Method of oxidizing ammonia, I have disclosed the essential principles governing the successful oxidation of ammonia to nitrose gases, and it was therein pointed out if a high efficiency is to be attained a large excess of air should be mixed with the ammonia before passing the catalyzer. It was also shown that this excess of air rendered it necessary to heat the catalyzers from outside sources in order to keep up the combustion.

In this invention I avoid the necessity of artificially heating the catalyzers, by enriching the air to be mixed with the ammonia with a quantity of oxygen to make the reaction self propagating. That is to say, I have found that if instead of using atmospheric air containing, say, 20% oxygen and 80% nitrogen, one employs an enriched air containing say 30% to 40% oxygen the catalytic oxidizing reaction becomes self supporting, even though an excess of air is employed, and the catalyzers need not in such cases be artificially heated, except incidentally or to start the reaction.

I have further found that a convenient method of obtaining this enriched air, is by liquefying atmospheric air, and permitting the nitrogen to boil off until about 40% oxygen or a somewhat higher percentage is left. The ammonia used in this process can be conveniently obtained by treating calcium cyanamid with steam, and the nitrogen boiled off can be conveniently used in the manufacture of said cyanamid. It therefore follows that the waste gases from a liquid air plant producing nitrogen can be employed to eliminate the necessity of heating the catalyzers after the reaction starts, it being only necessary to raise them to an initial starting temperature, after which the reaction is so strongly exothermic that it will continue of itself.

In the use of ordinary air, the concentration of the nitrose gases coming from the catalyzers is often not above 6% to 10%; but by employing an enriched gas, on the other hand, such as that disclosed, concentrations of exit gases of at least double these values are easily attained. I therefore produce a greater efficiency in condensation and concentration yields; and I also obtain in such cases a higher percentage of nitric acid, and effect a very great reduction in the cost of the absorption apparatus receiving said gases.

I have further found that by artificially cooling the mixture immediately before it comes in contact with the catalyzer a superior result is obtained as is set forth in my copending application No. 9595 above mentioned.

It of course, is likewise convenient in this process to employ a cooler through which the mixture passes before reaching the catalyzer, and also to employ an electric circuit to raise the catalyzer to the ignition temperature all as disclosed in my said applications above.

What I claim is:

1. The process of oxidizing ammonia to nitrose gases which consists in providing a mixture of oxygen, ammonia and air, containing above 30 per cent. oxygen; passing said mixture through a catalyzer; and raising said catalyzer to a temperature sufficient to start the reaction, substantially as described.

2. The process of oxidizing ammonia which consists in providing a mixture of ammonia and air, the latter containing above 30% of oxygen; subjecting said mixture to a cooling action; subjecting the cooled mixture to the action of a catalyzer;

and raising said catalyzer to a temperature sufficient to start the reaction, substantially as described.

3. The process of producing nitrose gases which consists in providing a mixture of oxygen, air and ammonia containing sufficient oxygen to sustain the reaction, but insufficient to cause a substantial decomposition of the ammonia, and subjecting said mixture at a constant pressure to the action of a hot catalyzer.

In testimony whereof I affix my signature in presence of two witnesses.

WALTER S. LANDIS.

Witnesses:
S. WARREN MAYS,
GEORGE A. HENDRIE.